(12) United States Patent  
Pailloux et al.

(10) Patent No.: US 8,720,254 B2
(45) Date of Patent: May 13, 2014

(54) DEVICE FOR DETECTING MICRO-LEAKS

(75) Inventors: Agnès Pailloux, Gif sur Yvette (FR); Julien Cousin, Reims (FR); Isabelle Debecker, Paris (FR); Jean-Marc Weulersse, Palaiseau (FR)

(73) Assignee: Commisariat a l'Energie Atomique et aux Energies Alternatives, Paris (FR)

( * ) Notice: Subject to any disclaimer, the term of this patent is extended or adjusted under 35 U.S.C. 154(b) by 282 days.

(21) Appl. No.: 13/143,128

(22) PCT Filed: Jan. 6, 2010

(86) PCT No.: PCT/EP2010/050080
§ 371 (c)(1),
(2), (4) Date: Nov. 2, 2011

(87) PCT Pub. No.: WO2010/079183
PCT Pub. Date: Jul. 15, 2010

(65) Prior Publication Data
US 2012/0036920 A1 Feb. 16, 2012

(30) Foreign Application Priority Data

Jan. 7, 2009 (FR) ...................................... 09 50070

(51) Int. Cl.
*G01M 3/30* (2006.01)
(52) U.S. Cl.
USPC .................. 73/40.5 R; 73/40.7; 73/866.5
(58) Field of Classification Search
USPC .............. 73/40, 40.5 R, 40.7, 866.5
See application file for complete search history.

(56) References Cited

U.S. PATENT DOCUMENTS

| 3,459,036 | A | * | 8/1969 | Powell | 73/40.5 R |
| 5,356,594 | A | * | 10/1994 | Neel et al. | 422/54 |
| 5,687,606 | A | * | 11/1997 | Reilly | 73/73 |
| 5,889,199 | A | * | 3/1999 | Wong et al. | 73/40 |
| 6,314,793 | B1 | * | 11/2001 | Webb et al. | 73/40.7 |
| 6,362,741 | B1 | * | 3/2002 | Hickox et al. | 340/605 |
| 6,619,103 | B1 | * | 9/2003 | Cardinale et al. | 73/40.7 |
| 6,626,027 | B1 | * | 9/2003 | Davey | 73/40.7 |
| 6,647,761 | B2 | * | 11/2003 | Barjesteh | 73/40 |
| 7,051,577 | B2 | * | 5/2006 | Komninos | 73/40.5 A |
| 7,156,976 | B2 | * | 1/2007 | Bley | 205/784 |
| 7,178,385 | B2 | * | 2/2007 | McCoy et al. | 73/40.7 |
| 8,176,770 | B2 | * | 5/2012 | Wetzig | 73/40.7 |

(Continued)

FOREIGN PATENT DOCUMENTS

DE 41 27 543 A1 2/1993
GB 1 301 021 A 12/1972

(Continued)

OTHER PUBLICATIONS

International Search Report for PCT/EP2010/050080 dated Mar. 3, 2010.

*Primary Examiner* — Hezron E Williams
*Assistant Examiner* — Alexander Mercado
(74) *Attorney, Agent, or Firm* — Pearne & Gordon LLP

(57) ABSTRACT

Micro-leaks are detected by means of a sniffer device including, in an original manner, a flat suction capsule (11) with divergent channels where the flow is regular, a resonant optical cavity (15) as a means of detection and a pump (16) with a low flow rate, which is insufficient to create a vacuum which would be required with other means of detection. Much fainter micro-leaks can be detected.

8 Claims, 3 Drawing Sheets

(56) References Cited

U.S. PATENT DOCUMENTS

Figure 1:
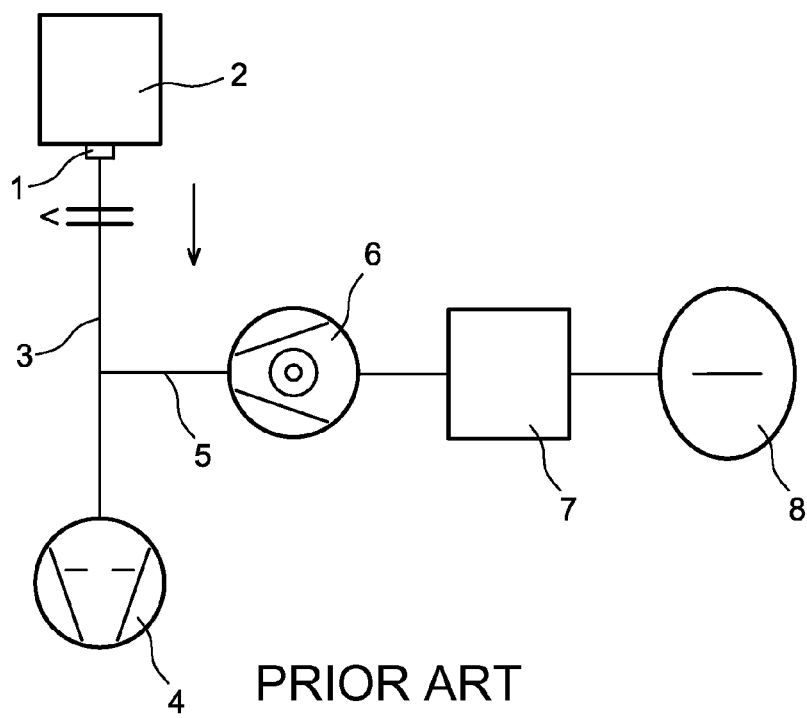

| | | | |
|---|---|---|---|
| 8,294,456 B2 * | 10/2012 | Grosse Bley et al. | 324/207.17 |
| 8,537,019 B2 * | 9/2013 | Rolff et al. | 340/605 |
| 2007/0240493 A1 * | 10/2007 | Conlan et al. | 73/40.7 |
| 2010/0288020 A1 * | 11/2010 | Enquist | 73/40.7 |

FOREIGN PATENT DOCUMENTS

| | | |
|---|---|---|
| GB | 1 431 269 A | 4/1976 |
| JP | 60-188829 A | 9/1985 |
| JP | 60-188829 A | 9/1985 |

* cited by examiner

DEVICE FOR DETECTING MICRO-LEAKS

The subject of the invention is a device for detecting micro-leaks of gas, particularly in a large structure, which also enables them to be located.

Micro-leaks are distinguished by their small rate of flow. It is sought to detect rates of flow of the order of $10^{-8}$ or $10^{-9}$ mbar·l/s. Certain common means of detecting larger leaks are inapplicable to them, and others have disadvantages: either they are too slow to be used to locate leaks in large structures, where very many measurements are required, or they are sensitive to certain types of air pollution, erroneously detecting the disturbances which they make to the measurement as leaks. Finally, others are specific to certain gases. In the present application we use a tracer gas which is injected behind the wall to be checked at a pressure enabling it to traverse the leaks, and we then use a sniffer device to capture continuously gaseous samples in front of the structure to be verified, and try to characterise the tracer gas in the samples.

The ordinary characterisation device is a mass spectrometer which ionises the molecules of the samples and subjects them to a magnetic field which deflects them in quantities which vary according to their atomic masses. It then becomes possible to isolate the ions of the tracer gas, but the mass spectrometer has several disadvantages. Firstly it is complicated to modify the settings to change which ions are detected. Detection itself can be inaccurate if ions of similar atomic masses coexist in the samples. Thus, in general, helium is chosen as the tracer gas, since an element of low atomic mass is easier to distinguish from elements close to it in the periodic table, and since helium, unlike hydrogen, the atomic mass of which is even lower, is non-flammable. However, it is unfortunate to be restricted to a single and rather costly tracer gas. Still more problematic is the fact that the presence of natural helium in air, which is much more abundant (5 ppm) than the levels of content which it is sought to measure (as low as approximately 1 ppb) requires a delicate zero-setting of the device.

Another type of disadvantage will now be explained using the description of a possible device in FIG. 1. The opening of a capsule 1 is placed on the surface of a structure 2 the airtightness of which must be checked, or held very close to it. A pipe 3 links the capsule 1 to a primary pump 4, which creates a suction of the gaseous volume present in the capsule 1 and in the surrounding volume by the pipe 3. A junction of the pipe 3 is occupied by a secondary turbo-molecular pump 6 and a mass spectrometer 7. Creation of a high vacuum with the primary pump 4 and the secondary pump 6 is necessary for the correct operation of the mass spectrometer 7 at a pressure lower than $10^{-4}$ mbar, failing which the ions would be subject to too many collisions in their trajectories, which would disturb the measurement.

The helium ions, having traversed the wall 2, finally exit the mass spectrometer 7 and are detected. The helium which has reached the primary pump 4 is, however, lost for the detection, which constitutes one more limitation for the detectable rate of flow of micro-leaks. The need to produce a high vacuum in practice requires a high suction flow rate, of the order of 40 l/s for small leakage rates. The device is therefore voluminous and noisy, and in practice it does not enable leakage rates of flow below $5.10^{-6}$ mbar·l/s to be detected, which is very much higher than the desired values.

Another more fundamental cause of insufficiency of the known devices is that the gas of the capsule is poorly drawn in. Even if a micro-leak is present in front of the capsule, a part of the gas to be detected can escape detection by remaining in the capsule for longer than the duration of the test, or be dispersed by the ambient circulation of the gas, even in an apparently undisturbed room. Partial detection also has the consequence that it raises the critical threshold above which detection is impossible.

One aim of the invention is to lower the limit of the micro-leak detection flow rates. Another purpose of the invention is to apply the device to tracer gases of the different chemical species.

In a general form the invention concerns a micro-leak detection device including a capsule which must be placed in front of a suspected micro-leak, a device for detecting a chemical species (tracer gas) which has leaked, a pipe connecting the capsule and the detection device, and a pump circulating gas through the pipe, characterised in that the capsule includes a main face, a peripheral face and ribs, where the main face is essentially flat, the peripheral face is essentially perpendicular to the main face, and contains openings, and the ribs are located under the main face diverging from a position where the pipe opens out in the peripheral wall, delimiting channels leading respectively to the openings.

The consequence of this arrangement of the capsule is that the volume it contains is distributed into channels the content of which is traversed by gas currents leading to the place where the pipe emerges. The entire content of the capsule is therefore drawn in and detected. The flat character of the main face gives channels of more uniform section, therefore reducing the flow irregularities. The peripheral face can be positioned on the wall to be inspected with sufficient airtightness to prevent the wall being swept by an undesired gas current which could carry away the gas to be detected. The external gas required for the suction passes through the openings and is channelled as far as the position where the pipes emerge.

According to an improvement, a total area of the openings is larger than a total section of the channels in the place where the pipe emerges, and this section is itself larger than a section of the pipes. Such an arrangement guarantees increasing speeds of the drawn gas, which improve the suction.

Also advantageously, the position where the pipe emerges is central, and there are at least eight opening channels. More regular channelling of the gas suction is accomplished if the channels are not too wide.

Under these conditions it is advantageous that the capsule is square and includes six channels and six openings in each side.

The detection threshold of the detectable flow rate is lowered still further and different species of tracer gases can be detected if the detection device includes a resonant optical cavity towards which the circulating gas is directed, and a laser device set at a line of absorption of light by the chemical species, if and the pump has a flow rate at most equal to 1 l/min of the gas, and preferably between approximately 60 cm$^3$/min and 120 cm$^3$/min.

Figure 2:
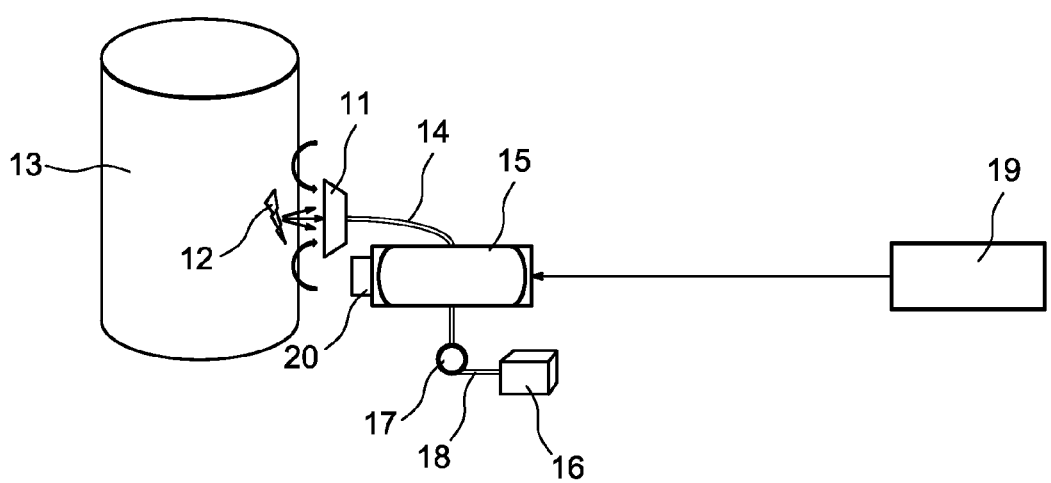
Figure 3:
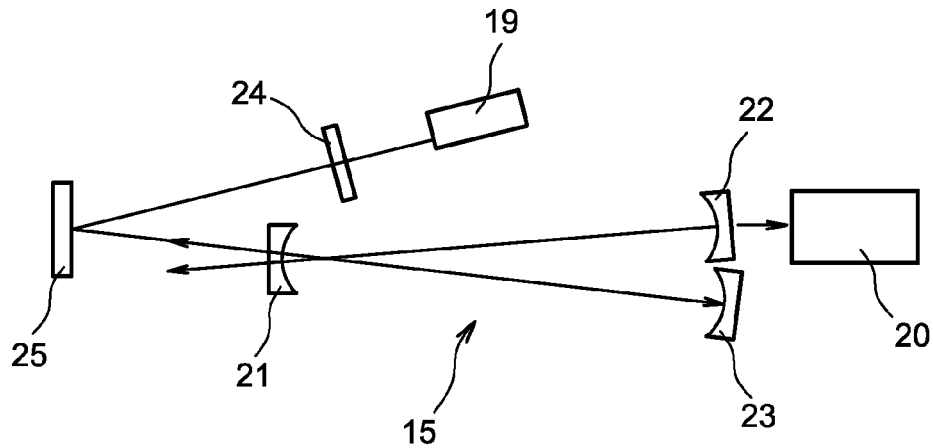
Figure 4:
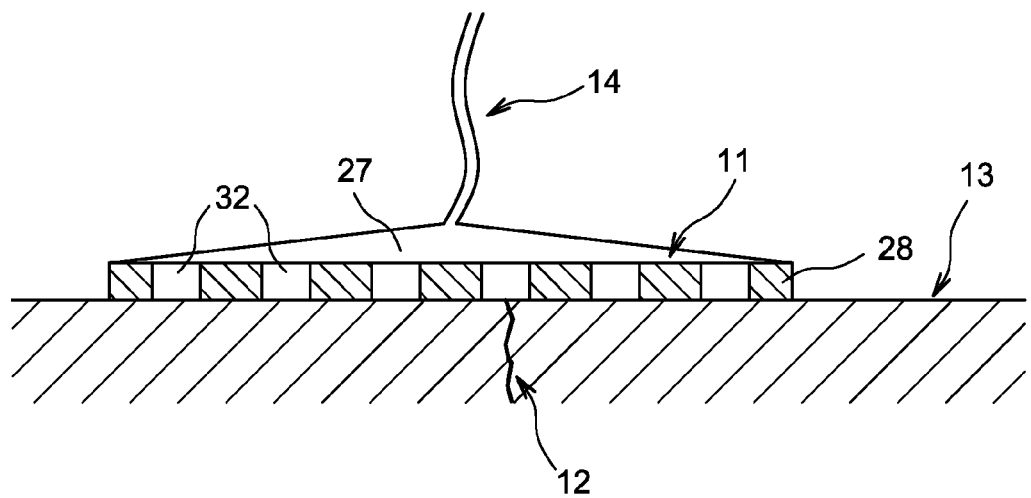
Figure 5:
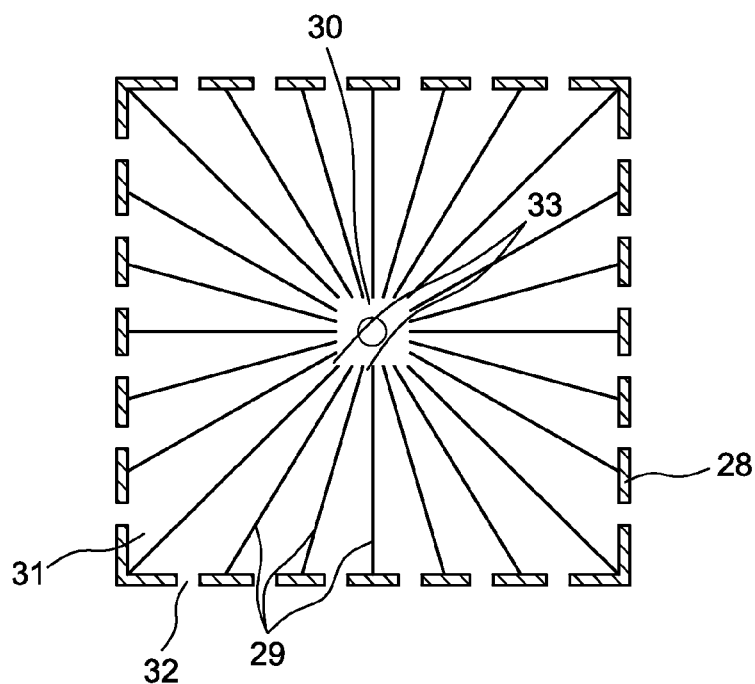
Figure 6:
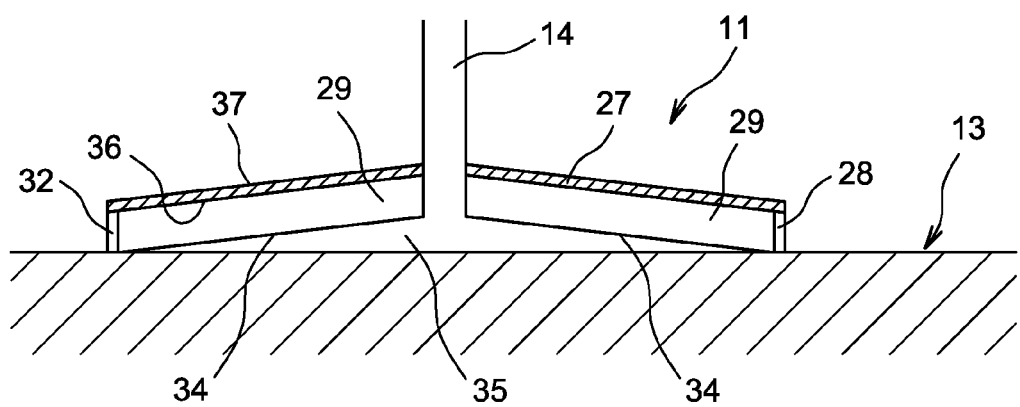

The invention will now be described in greater detail with reference to the following figures:

FIG. 1, previously described, represents a device in accordance with the prior art, FIG. 2, a device in accordance with the invention, FIG. 3 shows a resonant optical cavity in detail, FIG. 4 is a side view of the capsule, FIG. 5, a top view of the capsule, and FIG. 6 is a section of the capsule.

Let us consider FIG. 2. The device according to the invention includes a suction capsule 11 placed before a micro-leak 12 (either real or suspected) of a wall 13 to be examined, and the capsule 11 is fitted with a pipe 14 which connects it with a resonant cavity 15 the content of which is renewed by a pump 16, which in this case is a pump of low flow rate, of the order of 60 to 120 cm³ of gas per minute, at ambient pressure, and no vacuum is created. Higher and lower values can also be proposed, in accordance with the leakage rates which it is sought to detect. Rates of flow substantially greater than 1 l/min would be of no interest since they would be suitable for rates higher than micro-leaks, for which other methods would be applicable. Other important elements of the device are a flow rate control valve 17 positioned on a second pipe 18 connecting the resonant cavity 15 to a pump 16, a laser 19 pointing a light beam in the direction of the resonant cavity 15 and a photodetector 20 measuring the absorption of the beam by the content of the cavity, and thus indicating the concentration in the atmosphere of the resonant cavity 15 of the chemical species responsible for this absorption.

Let us now consider the description of the capsule 11 with reference to FIGS. 4 and 5.

It includes an upper main face 27, which is roughly flat, a peripheral face 28 which is essentially perpendicular to the previous face, and ribs 29 which are located under the main face 27 and surrounded by the peripheral face 28. The free edge of the peripheral face 28 is applied to the wall 13 to be inspected with sufficient airtightness to prevent substantial rates of flow of gas under the capsule 11. The main face 27 can advantageously be of a slightly convex or conical shape, to facilitate the application of a force pinning the capsule 11 on the wall 13 to be examined, and facilitating the airtightness between the capsule 11 and the wall 13 to be examined through the lower part of the peripheral face 28. Indeed, the surface in contact with the wall 13 to be examined is advantageously of a shape which is slightly more concave than the wall, such that contact is made only by the peripheral face 28. The measuring volume of the capsule 11 inside the latter is, however, typically much wider than it is high, and is slightly variable in height, unlike the conical or bulb-like shapes which are commonly found in various techniques. The orifice of the pipe 14 arrives in the middle of the main face 27 and traverses it, opening into a central location 30. The ribs 29 all diverge from the central location 30 to the peripheral face 28 delimiting channels 31. Their height is similar to that of the peripheral face 28, such that the channels 31 do not communicate with one another, except by leaks if there are still gaps with the wall 13. The peripheral face 28 is fitted with openings 32 which respectively enable the channels 31 to communicate with the outside. In accordance with the preceding observations, the ribs 29 have, according to FIG. 6, a lower edge 34 which rises slightly from the peripheral face 28 such that the latter is indeed supported on the wall 13. The volume 35, under the lower edges 34, is carried away by the flow in the channels 31. As a variant, the upper face 27 could have a flat bottom 36 instead of being conical, so as to keep a flow which does not vary in height as far as the pipe 14; the top 37 can remain conical to make it easier to grip.

The main properties of the invention can be listed as follows: since there is no requirement to form a vacuum in the optical resonant cavity 15 which constitutes the detector, a small pumping flow rate is sufficient, which is nonetheless sufficient to draw in most all of the leaking tracer gas, whilst making all of it pass through the detector; the laser 19 can be easily adjusted to produce a light corresponding to a line of absorption by the chemical species of the tracer gas; detection remains rapid due to the small gaseous volume of the device, which enables a sample to be renewed in a few seconds or a few tenths of a second; and, above all, the gas is regularly drawn in the capsule 11, by convergent currents originating from outside, and entering it through the openings 32, carrying with them all the leaking gas, when there is one, which greatly improves the detection accuracy. These advantages derive from the fact that the channels impose regular flows, without any dead volumes, and that the possible losses due to outside currents or to possible diffusion are reduced or nonexistent, since the capsule 11 can be placed on the wall 13 allowing only a very small gap. The advantage is still greater if the gas is regularly accelerated as it is drawn in, something which can be assumed to be accomplished if the area of the input openings 32 in each channel 31 is greater than the section of the channels 31 at the locations 33 where they open out into the central location 31, and if the section of the pipe 14 is smaller than the total section of these locations 33.

An important shape of the invention is a V-shaped optical resonant cavity 15, as represented in FIG. 3. It is then principally delimited by an input mirror 21, located on the side of the laser 19, and a pair of output mirrors 22 and 23 located side-by-side and on the side of the photodetector 20. In this particular embodiment the light beam also passes through a polariser 24 and a beam-folding mirror 25 before reaching the input mirror 21. The light beam having traversed the input mirror 21 and having entered the resonant cavity 15 firstly arrives at the output mirror 23 before being returned to the input mirror 21, which returns it in its turn to the other output mirror 22. This device known in the art has the advantage that it procures a refinement of the spectral line of the laser light and stabilisation of the frequency.

Appropriate values for the implementation of the invention are a total internal volume of 40 cm³ for the capsule 11, the pipe 14 and the resonant cavity 15; 60 to 120 cm³/min for the pumping flow rate; 86 cm total length for the resonant cavity 15 (by adding together both branches of the V); 1 m for the length of the pipe 14;

0.36 cm for the diameters of the pipe 14 and of the resonant cavity 15. The laser is of the adjustable diode type. The capsule 11 is favourably square in shape to allow complete inspection of the wall 13 by successive movements in two directions. The sides of the square can be 10 cm in length. The inner height of the capsule 11 can be 2 mm to give an inner volume roughly equal to 20 cm³. There can be four ribs 29 and openings 32 on each side, and preferably six to give a sufficiently regular flow. With six openings and six channels per side, each of the openings 32 can be 2 mm wide and 2 mm high; the locations 33 of the outputs of the channels 31 can each be 1.5 mm wide and, again, 2 mm high. The pipe 14 can be 1 m long and have a section of 10 mm² for a volume of 10 cm³. For an average flow rate of 90 cm³/min, the speed of the gas through the openings 32 is approximately 1.4 cm/s, 2 cm/s at the output locations 33 of the channels, and total time is approximately 30 s for the drawn sample to arrive at the detector. Tests have enabled concentrations of 1 to 5 ppb to be measured, corresponding to micro-leaks of the order of $1.10^{-8}$ to $1.10^{-9}$ mbar·l/s, in the case of leaks of methane and acetylene. These tracer gases have the advantage that they are not abundant in natural air in the case of the first (1.9 ppm) and non-existent in the other case.

The invention claimed is:

1. A device for detecting micro-leaks in a wall, including a capsule (11) covering and surrounding a micro-leak (12) by a peripheral face (28), a device for detecting a chemical species having leaked, a pipe (14) connecting a main face (27) of the capsule and the detection device, and a pump (16) circulating gas through the pipe, wherein the capsule (11) includes the main face (27), the peripheral face (28) and ribs (29), where the main face is essentially flat, the peripheral face is essentially perpendicular to the main face and has openings (32), and the ribs (29) are located under the main face, diverging from one another in a radial direction, from a location (30) where the pipe (14) emerges from the capsule in the peripheral face (28), delimiting channels (31) leading respectively to the openings (32) of the peripheral face.

2. A device for detecting micro-leaks according to claim 1, wherein a total area of the openings (32) is larger than a total section of the channels (31) arriving at the location (30) where the pipe emerges, itself being larger than a section of the pipe (14).

3. A device for detecting micro-leaks according to claim 1, wherein the location (30) where the pipe emerges is central, and in that there are at least eight channels and openings.

4. A device for detecting micro-leaks according to claim 3, wherein the capsule is square and has six channels and six openings per side.

5. A device for detecting micro-leaks according to claim 1, wherein the detection device includes a resonant optical cavity (15) towards which the circulating gas is directed, and a laser (19) set to a line of absorption of light by the chemical species, and the pump (16) has a flow rate at most equal to 1 l/min of the gas.

6. A device for detecting micro-leaks according to claim 5, wherein the flow rate of the pump is between 60 and 120 $cm^3$/min of the gas.

7. A device for detecting micro-leaks according to claim 5, wherein the resonant cavity is V-shaped.

8. A device for detecting micro-leaks, according to claim 1, wherein the ribs (29) have a lower edge (34) which rises from the peripheral face (28) to the pipe (14).

* * * * *

UNITED STATES PATENT AND TRADEMARK OFFICE
CERTIFICATE OF CORRECTION

| | | |
|---|---|---|
| PATENT NO. | : 8,720,254 B2 | Page 1 of 1 |
| APPLICATION NO. | : 13/143128 | |
| DATED | : May 13, 2014 | |
| INVENTOR(S) | : Agnes Pailloux et al. | |

It is certified that error appears in the above-identified patent and that said Letters Patent is hereby corrected as shown below:

In the Specification

Column 1, line 45, please insert --5-- between "junction" and "of"

Signed and Sealed this
Sixteenth Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,720,254 B2  
APPLICATION NO. : 13/143128  
DATED : May 13, 2014  
INVENTOR(S) : Pailloux et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this
Twenty-ninth Day of September, 2015

Michelle K. Lee
*Director of the United States Patent and Trademark Office*